United States Patent Office 2,983,100
Patented May 9, 1961

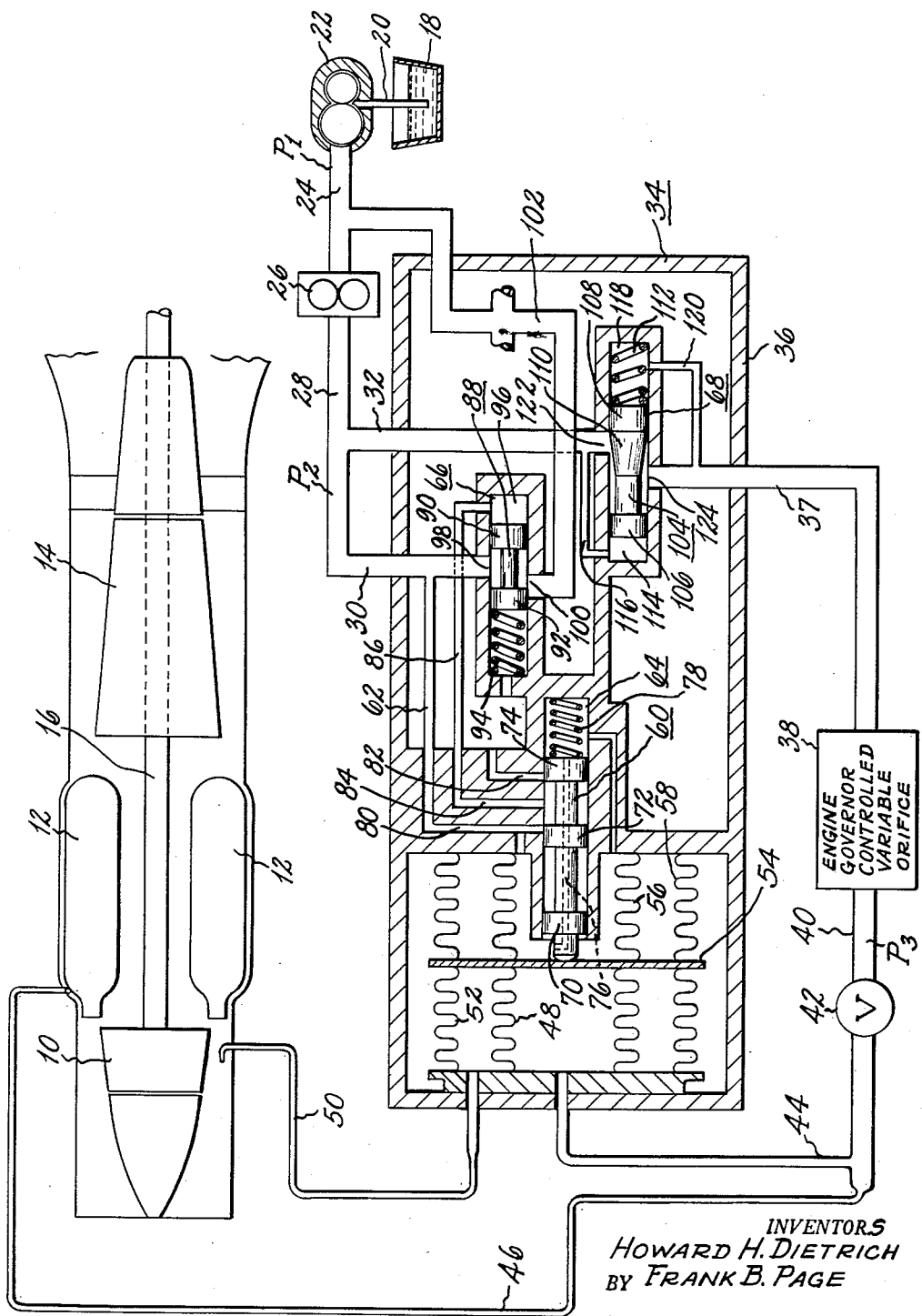

2,983,100

FUEL CONTROL SYSTEM

Howard H. Dietrich, Rochester, and Frank B. Page, Pattersonville, N.Y., assignors to General Motors Corporation, Detroit, Mich., a corporation of Delaware Filed Mar. 16, 1956, Ser. No. 572,080

10 Claims. (Cl. 60—39.28)

This invention pertains to fuel control systems, and particulary to a fuel control system for jet and gas turbine engines.

At the present time, jet engines having a turbine driven compressor, and gas turbine engines, have only a limited range of speed adjustment. That is, these engines only operate efficiently over a limited range near full rated speed, and are generally equipped with a governor which controls fuel flow to the engine by varying the area of an orifice. The governor also responds to overspeeding of the engine by reducing the supply of fuel thereto so as to prevent engine destruction due to overspeeding. In some engines of the aforesaid type, fuel flow at rated speed must be directed proportional to compressor discharge total pressure. This relationship is necessary since to maintain the required fuel-air ratio, the fuel supplied must change with variations in the air supplied. The present invention relates to a fuel control system which satisfies the aforesaid requirements and, yet, is substantially insensitive to variation in fuel pump output pressure. Accordingly, among our objects are the provision of a fuel system including means for maintaining a pressure drop accross a regulator and a governor proportional to compressor discharge total pressure irrespective of variations in the inlet fuel pressure; and the further provision of a fuel system including means for varying the pressure drop across a governor controlled orifice to produce a fuel flow therethrough directly proportional to the difference between regulator inlet fuel pressure and governor outlet fuel pressure during variation in compressor discharge total pressure at the control position, and wherein the fuel pressure drop between the regulator inlet and the governor outlet is directly proportional to compressor discharge total pressure.

The aforementioned and other objects are accomplished in the present invention by employing a regulator valve having a flow port area responsive to pressure. Specifically, the regulator includes a bypass valve, a pilot valve and a throttle valve. The pilot valve position is controlled by a bellows assembly comprising opposed bellows subjected to vacuum and compressor discharge total pressure, and opposed bellows subjected to inlet pressure to the regulator and outlet pressure from the governor controlled orifice. The pilot valve is hydraulically balanced and, therefore, responds directly to variations in the pressure drop across the regulator and governor, as well as variations in the compressor discharge total pressure. To achieve the desired results, the regulator and the governor are connected in series so that all fuel supplied to the engine flows through both the regulator throttle valve and the governor controlled orifice.

The bypass valve is urged in one direction by a calibrated spring. Movement of the bypass valve by the spring is opposed by pilot valve controlled pressure in a servo chamber. During steady state engine operation, i.e. with total compressor discharge pressure and engine speed constant, the fuel supplied to the engine will not be affected by variations in the inlet pressure to the regulator since, under these conditions, the pilot valve positions the bypass valve so that the pressure drop across the regulator and the governor remains constant. Since, with an orifice of a given size, the flow therethrough is directly proportional to the square root of the pressure drop across the orifice, if the pressure drop remains constant, the flow will necessarily remain constant.

During variations in compressor discharge pressure, such as caused by changes in the altitude, temperature, engine speed, or flight speed, the pilot valve is actuated by variations in the total compressor discharge pressure. Under these conditions, the pilot valve controls the position of the bypass valve so that the sum of the pressure drops across the regulator throttle valve and the governor controlled orifice varies in direct proportion to compressor discharge pressure. The regulator throttle valve is urged in one direction by a calibrated spring and the regulator outlet pressure. Movement of the throttle valve by the spring and regulator outlet pressure is opposed by regulator inlet pressure. The throttle valve has a contoured throttling surface such that upon an increase in compressor discharge pressure, at the control position, the throttle valve contributes a lesser component of pressure drop so that the fuel supplied to the engine is directly proportional to the total pressure drop across the regulator throttle valve and the governor controlled orifice. Since the total pressure drop across the control unit, i.e. the sum of the pressure drops across the governor and regulator, is proportional to compressor discharge pressure, the fuel flow to the engine will also be proportional to compressor discharge pressure.

Further objects and advantages of the present invention will be apparent from the following description, reference being had to the accompanying drawing wherein a preferred embodiment of the present invention is clearly shown and which constitutes a schematic diagram of the fuel control system of this invention.

With particular reference to the drawing, the fuel control system is shown in conjunction with a gas turbine engine having a compressor 10, combustion chambers 12 and a turbine 14, which is connected with the compressor 10 through a shaft 16. The gas turbine engine is shown in schematic form, and is only by way of illustration and not by way of limitation, since the fuel control system of this invention can be used with any engine having a driven compressor.

The fuel system includes a fuel reservoir 18 to which the inlet 20 of a booster pump 22 is connected. Pump 22 discharges into conduit 24, and the pressure of the fuel in conduit 24 will be designated as $P_1$, this pressure varying with variation in the speed of the pump 22. Conduit 24 is connected to the inlet of a fuel pump 26, which discharges into a conduit 28 in which the fuel has a pressure $P_2$, likewise variable. Conduit 28 is connected to branch conduits 30 and 32 constituting the inlets for a regulator generally indicated by the numeral 34, which is disposed within a casing 36. The regulator 34 has an outlet conduit 37 connected to the inlet of an engine governor controlled variable orifice 38 of conventional design and construction. It is pointed out that the regulator 34 and the governor controlled orifice 38 are in series relationship, and the outlet of the orifice 38 is connected to a conduit 40 having manually operable shut off valve 42 therein. The pressure in conduit 40 will be denoted by $P_3$, and fuel from conduit 40 flows to branch conduits 44 and 46. Conduit 46 connects with the combustion chambers 12 of the engine through suitable fuel nozzles, not shown. Conduit 44 communicates with the interior of a bellows 48 of the regulator 34. In addition, the total discharge pressure of the compressor 10 is picked up by a conduit 50 and applied to a bellows 52. The coaxial bellows 48 and 52 engage one side of a movable abutment 54, the other side of which is engaged by coaxial bellows 56 and 58 and the end of a plunger 60.

The interior of bellows 58 is evacuated, and is, thus, at substantially zero p.s.i.a. The interior of bellows 56 is connected by a conduit 62 to the conduit 30 and is, thus, at fuel pressure $P_2$. The plunger 60 forms part of a pilot valve depicted generally by numeral 64, and the regulator also includes a bypass valve 66 and a regulator throttle valve 68.

The plunger 60 is formed with three spaced lands 70, 72 and 74 and has an axial bore 76 therethrough. The plunger 60 is maintained in contact with the abutment 54 by a compression spring 78, and is hydraulically balanced since opposite ends thereof are subjected to fuel pressure $P_2$. Land 72 controls a port 80 and land 74 controls a port 82, the annular channel between lands 72 and 74 communicating with a port 84 connected with a conduit 86. Since the pilot valve plunger 60 is hydraulically balanced, it responds directly to variations in the fuel pressure drop, namely $P_2$ minus $P_3$, across the regulator 34 and orifice 38, as well as to variations in the total compressor discharge pressure as sensed by bellows 52.

The bypass valve 66 includes a plunger 88 having spaced lands 90 and 92, the plunger 88 being urged to the right by a calibrated spring 94. The end surface of land 80 is subjected to pressure fluid from conduit 86, which communicates with a chamber 96 of the bypass valve. The annular channel between lands 90 and 92 communicates with a port 98 connected with the inlet conduit 30 and a port 100 connected to a bypass conduit 102, which connects with the interior of the housing 36 and the conduit 24.

During steady state engine operation, that is, when the throttle setting, compressor discharge pressure, and engine speed are constant, the fuel supplied to the engine will not be affected by variations in the inlet pressure, $P_2$, since the pilot valve 64 controls the position of the bypass valve 66 by connecting chamber 96 and conduit 86 either to inlet pressure $P_2$ or to drain through ports 80 and 82, respectively, so that the pressure drop across the regulator 34 and the governor orifice 38, namely $P_2$ minus $P_3$ remains substantially constant. Since under steady state engine operation, the size of the orifice 38 remains constant, the flow of fuel to the engine will also remain constant irrespective of variations in the inlet fuel pressure.

The regulator throttle valve 68 comprises a plunger 104 having the spaced lands 106 and 108 with a contoured, or tapered, throttling surface, 110 therebetween. The plunger 104 is urged to the left by a calibrated spring 112, and the end of land 106 is acted upon by fuel pressure in chamber 114, which is connected by branch conduit 116 with the conduit 32. In addition, chamber 118 within which the spring 112 is disposed is subjected to regulator outlet fuel pressure from conduit 37 through branch conduit 120. Therefore, the position of the regulator throttle valve plunger 104 is determined by the difference between the fuel pressures in conduit 32 and conduit 37 plus the force of the spring 112. The contoured throttling surface 110 cooperates with ports 122 and 124 so as to control the pressure drop between conduits 32 and 37. In other words, the area of port 122 is responsive to the difference between the pressures in conduits 32 and 37, as modified by the spring 112, the throttle valve 68 being designed so that the sum of the pressure drops across the regulator and the governor controlled orifice vary in direct proportion to fuel flow. The component pressure drops across the regulator and the governor controlled orifice are such that upon an increase in compressor discharge pressure at the control position of the governor 38, the throttle valve 68 contributes a lesser component of pressure drop so that the fuel supplied to the engine is directly proportional to the total compressor discharge pressure. Consequently, the regulator throttle valve 68 compensates the fuel system so that actual fuel flow to the engine varies in direct proportion to the pressure drop across the regulator and governor orifice, namely $P_2$ minus $P_3$, rather than as the square root of the pressure drop across a single orifice.

While the embodiment of the present invention as herein disclosed, constitutes a preferred form, it is to be understood that other forms might be adopted.

What is claimed is as follows:

1. A fuel control system for an engine having a turbine driven compressor including; a source of fuel under pressure, regulator means having a fuel inlet connected to said source, a fuel bypass, and a fuel outlet; an engine governor controlled variable orifice having an inlet connected to the outlet of said regulator means and an outlet connected to said engine; and means controlling said fuel bypass responsive to total compressor discharge pressure and the pressure drop across said regulator means and said orifice to maintain said pressure drop proportional to the total compressor discharge pressure; said regulator means including a throttle valve and means responsive to flow through the throttle valve effective to open the throttle valve in response to increase in said flow, the throttle valve being so contoured that the sum of the pressure drops across the said throttle valve and the governor controlled orifice is substantially proportional to the said flow.

2. A fuel control system as recited in claim 1 in which the means responsive to flow across the said throttle valve comprises means responsive to the pressure drop of the fuel across the said throttle valve.

3. A fuel control system for an engine having a turbine driven compressor including; a source of fuel under pressure, regulator means having a fuel inlet connected to said source, a fuel bypass, and a fuel outlet; an engine governor controlled variable orifice having an inlet connected to the outlet of said regulator means and an outlet connected to said engine; and means controlling said fuel bypass responsive to total compressor discharge pressure and the pressure drop across said regulator means and said orifice to maintain said pressure drop proportional to the total compressor discharge pressure; said regulator means including a throttle valve having a flow port area responsive to the difference between regulator means inlet fuel pressure and regulator means outlet fuel pressure to compensate the governor controlled orifice, said regulator throttle valve comprising a plunger having a pair of spaced lands with a contoured throttling surface therebetween, the end surface of one of said lands being responsive to inlet fuel pressure to the regulator regulating means, the end surface of the other land being responsive to outlet fuel pressure of the regulating means plus the force of a calibrated spring.

4. Apparatus of the character set forth in claim 3 wherein the means responsive to total discharge pressure comprises a pair of oppositely acting bellows, one of which is subject to total compressor discharge pressure and the other of which is subject to vacuum.

5. A fuel control system for an engine having a turbine driven compressor including; a pump for supplying fuel under pressure, regulating means having a fuel inlet connected to the outlet of said pump, a bypass connected to the inlet of said pump and a fuel outlet; an engine governor controlled variable orifice having an inlet connected to the outlet of said regulating means and an outlet connected to said engine; and means operatively associated with said regulating means for maintaining the pressure drop between regulator means inlet fuel pressure and governor orifice outlet pressure proportional to total compressor discharge pressure irrespective of variations in the inlet fuel pressure to the regulator means; said last recited means including a bellows assembly comprising two pair of opposed bellows, one pair being subject to total compressor discharge pressure and governor orifice outlet fuel pressure, the other pair of bellows being subject to regulator means inlet pressure and vacuum.

6. A fuel system for a gas turbine engine comprising, in combination, means for supplying fuel under pressure; a regulator valve and an engine governor operated valve connected in series between the supplying means and the engine; control means for maintaining a controlled variable total pressure drop across the said valves; the normal pressure drop across the governor-operated valve at a predetermined opening thereof being substantially proportional to the square of the flow therethrough; the pressure drop across the regulator valve being substantially equal to a constant times flow less the said normal pressure drop across the governor-operated valve corresponding to the value of flow, so that the flow through the governor-operated valve at the predetermined opening thereof is substantially proportional to the said total pressure drop; the regulator valve comprising a throttle valve and means responsive to flow through the throttle valve connected to the throttle valve effective to vary the opening of the throttle valve to maintain the pressure drop therethrough as recited herein.

7. A fuel system as recited in claim 6 in which the said control means responds to compressor discharge pressure and maintains the said total pressure drop proportional to compressor discharge pressure.

8. A fuel control system for a gas turbine engine including a compressor, combustion apparatus, and a turbine, and a pump for supplying fuel under pressure; the engine having a fuel requirement approximately proportional to the discharge pressure of the compressor; the control system comprising, in combination, an engine governor controlled variable orifice means, a regulator throttle valve, and a bypass valve, the orifice means and the regulator valve being connected in a series circuit between the pump and the combustion apparatus, and the bypass valve connecting the pump outlet to the pump inlet; the bypass valve being biased in bypass valve opening direction by the pressure drop across the orifice means and the regulator valve and biased in the bypass valve closing direction by compressor discharge pressure and maintaining a pressure drop across the orifice means and regulator valve proportional to compressor discharge pressure; operating means for the regulator valve coupled thereto moving the regulator valve in the opening direction in response to increase in flow through the regulator valve, the regulator valve having a throttling member contoured so as to produce a pressure drop complementing the pressure drop across the orifice means to maintain a substantially linear relation between the total pressure drop across the regulator valve and orifice means and the flow therethrough.

9. A fuel control system for a gas turbine engine including a compressor, combustion apparatus, and a turbine, and a pump for supplying fuel under pressure; the engine having a fuel requirement approximately proportional to the discharge pressure of the compressor; the control system comprising, in combination, an engine governor controlled variable orifice means, a regulator throttle valve, and a bypass valve, the orifice means and the regulator valve being connected in a series circuit between the pump and the combustion apparatus, and the bypass valve connecting the pump outlet to the pump inlet; bypass valve operating means coupled to the bypass valve and biased in bypass valve opening sense by the pressure drop across the orifice means and regulator valve, and in the bypass valve closing sense by compressor discharge pressure, the operating means and bypass valve maintaining a pressure drop across the orifice means and regulator valve proportional to compressor discharge pressure; operating means for the regulator valve biasing the regulator valve in the opening direction in response to pressure drop through the regulator valve, and resilient means biasing the regulator valve in the closing direction, so that the regulator valve opens with increasing flow; the regulator valve having a throttling member contoured so as to produce a pressure drop complementing the pressure drop across the orifice means to maintain a substantially linear relation between the total pressure drop across the regulator valve and orifice means and the flow therethrough.

10. A fuel control system for a gas turbine engine including a compressor, combustion apparatus, and a turbine, and a pump for supplying fuel under pressure; the engine having a fuel requirement approximately proportional to the discharge pressure of the compressor; the control system comprising, in combination, an engine governor controlled variable orifice means, a regulator throttle valve, and a bypass valve, the orifice means and the regulator valve being connected in a series circuit between the pump and the combustion apparatus, and the bypass valve connecting the pump outlet to the pump inlet; bypass valve operating means coupled to the bypass valve and connected to the pump outlet and to the circuit downstream of the orifice means and regulator valve and biased in bypass valve opening sense by the pressure drop across the orifice means and regulator valve, and connected to the compressor outlet so as to be biased in the bypass valve closing sense by compressor discharge pressure, the operating means and bypass valve maintaining a pressure drop across the orifice means and regulator valve proportional to compressor discharge pressure; operating means for the regulator valve coupled thereto and connected to the circuit immediately ahead of and downstream of the regulator valve biasing the regulator valve in the opening direction in response to pressure drop through the regulator valve, and resilient means biasing the regulator valve in the closing direction, so that the regulator valve opens with increasing flow; the regulator valve having a throttling member contoured so as to produce a pressure drop complementing the pressure drop across the orifice means to maintain a substantially linear relation between the total pressure drop across the regulator valve and orifice means and the flow therethrough.

References Cited in the file of this patent

UNITED STATES PATENTS

| | | |
|---|---|---|
| 2,643,514 | Jubb | June 30, 1953 |
| 2,644,513 | Mock | July 7, 1953 |
| 2,693,081 | Russ | Nov. 2, 1954 |
| 2,703,961 | Harding | Mar. 15, 1955 |

FOREIGN PATENTS

| | | |
|---|---|---|
| 1,075,669 | France | Apr. 14, 1954 |
| 745,146 | Great Britain | Feb. 22, 1956 |